United States Patent [19]

Kimura

[11] Patent Number: 4,791,637
[45] Date of Patent: Dec. 13, 1988

[54] GAS LASER GENERATOR

[75] Inventor: Masao Kimura, Odawara, Japan

[73] Assignee: Amada Company, Limited, Japan

[21] Appl. No.: 19,136

[22] Filed: Feb. 25, 1987

[30] Foreign Application Priority Data

Feb. 25, 1986 [JP] Japan ................................ 61-038334
Feb. 25, 1986 [JP] Japan ................................ 61-025050

[51] Int. Cl.$^4$ ............................................. H01S 3/03
[52] U.S. Cl. ........................................ 372/58; 372/59; 372/83; 372/86; 372/87
[58] Field of Search ................... 372/58, 61, 87, 83, 372/35, 86, 81, 59

[56] References Cited

U.S. PATENT DOCUMENTS

| | | | |
|---|---|---|---|
| 3,863,103 | 1/1975 | Eckbreth et al. | 372/58 |
| 4,058,778 | 11/1977 | Fahlen et al. | 372/58 |
| 4,096,449 | 6/1978 | Foster | 372/58 |
| 4,099,143 | 7/1978 | Foster | 372/58 |
| 4,114,114 | 9/1978 | Pressley et al. | 372/58 |
| 4,217,560 | 8/1980 | Kosyrev et al. | 372/58 |
| 4,541,097 | 9/1985 | Kuwabara et al. | 372/87 |
| 4,748,635 | 5/1988 | McLellan | 372/87 |

FOREIGN PATENT DOCUMENTS

| | | | |
|---|---|---|---|
| 1040735 | 10/1978 | Canada | 372/87 |
| 0128890 | 10/1980 | Japan | 330/4.3 |
| 6080293 | 5/1985 | Japan | 372/87 |

Primary Examiner—William L. Sikes
Assistant Examiner—Xuan T. Vo
Attorney, Agent, or Firm—Wigman & Cohen

[57] ABSTRACT

A gas laser generator comprises a frame, a gas channel through which a gas flows, a mirror for obtaining a laser beam, defining a resonant cavity, an anode electrode and at least two first and at least two second cathode electrodes arranged in the lower and the upper portions of the resonant cavity, respectively, and a power source, in which a first voltage of a first electric field between the first cathode electrodes connected to the power source through a first ballast resistance and the anode electrode and a second voltage of a second electric field between the second cathode electrodes connected to the power source through a second ballast resistance and the anode electrode are so determined that the former is smaller than the latter so that the current flowing in the first electric field may be substantially equal to the current flowing in the second electric field during the electric discharges between the electrodes.

6 Claims, 4 Drawing Sheets

GAS LASER GENERATOR

BACKGROUND OF THE INVENTION

1. Field of the Invention

The present invention relates to a gas laser generator, and, specifically, to a gas laser generator which gives a uniform and stable discharge in the discharge region.

2. Description of the Related Art

Conventionally, a triaxial transverse type of gas laser generator for example, is known. In this gas laser generator the gas flows in the predetermined direction (Z-axis direction) of the discharge region, while a mirror system for an optical resonator and positive and negative discharge electrodes are respectively positioned in opposition in two directions at right angles (X-axis direction, Y-axis direction), interposing the gas flow.

The mirror system is usually the so-called folded type of optical resonator for improving the gain of the optical resonator. In the optical resonator, for example, a rear folding mirror and a front folding mirror are positioned, as a pair, in opposition on both the right and left sides, interposing the gas flow. A primary mirror is positioned adjacent to the downstream side of the rear folding mirror with reference to the gas flow. In addition, an output mirror is positioned adjacent to the upstream side of the front folding mirror with reference to the gas flow.

Accordingly, the optical cavity of the optical resonator, which is interposed by the mirror system, has a uniform width parallel to the gas flow, and the laser beam is uniformly amplified within the upstream gas flow and the downstream gas flow in this cavity.

The discharge electrodes are positioned in multiple locations in a two-dimensional expanse on both the top and bottom sides of the optical cavity in order to uniformly excite the gas flowing in the optical cavity.

The ions generated at a uniform excitation discharge of the upstream electrodes in this type of discharge device stream to the vicinity of the electrode on the downstream side, so that the resistance in the electrode gap on the downstream side declines tremendously, and the discharge deviates toward the downstream side. The downstream discharge proceeds in a localized arc, giving rise to the problem that instability could be produced in the excitation discharge.

In addition, even if the arc discharge does not shift, there is also the problem that irregularities are produced in the discharge, and various inconveniences are produced in the laser output and mode pattern.

Ballast resistances (stable resistances) are connected to a plurality of electrodes which are positioned in a two-dimensional expanse to provide stability of discharge.

The power consumed by this ballast resistance during laser generation amounts to several KW and a large amount of heat is generated. Accordingly, the ballast resistances which are connected to each of the electrodes are housed in a cooling receptacle filled with insulating oil which cools them. The number of ballast resistances must be the same as the number of electrodes, and, for a unit provided with simmer resistances, the same number of resistances are added. In addition, there are also units in which the same number of diodes are provided. Accordingly, the wiring between the resistances and elements in the cooling receptacle becomes extremely complex, and, also, it is difficult to cool the individual ballast resistances uniformly so that the stability of the discharge is a problem area.

SUMMARY OF THE INVENTION

A first object of the present invention is to provide, with due consideration to the drawbacks of such conventional devices, a gas laser generator which gives a uniform and stable discharge in the discharge region.

A second object of the present invention is to provide a gas laser generator in which no irregularities are produced in the discharge and which is able to produce a laser beam with a high output and suitable mode pattern.

A third object of the present invention is to provide a gas laser generator in which the wiring and the like of a plurality of ballast resistances is easily performed, and in which the ballast resistances are uniformly cooled to provide a stable discharge.

In order to accomplish these objects of the present invention, in the gas laser of the present invention a plurality of electrodes are positioned in the direction of flow of the gas which is the laser medium, and the electric field on the downstream side of the gas flow is smaller than the electric field on the upstream side, so that when ions are generated by the discharge, the discharge in the gas flow of the upstream side and the discharge in the gas flow of the downstream side are substantially the same.

In addition, in the gas laser generator of the present invention, a plurality of ballast resistances which are connected to a plurality of electrodes are arranged on a printed board, and the ballast resistances and this printed board are immersed in a cooling receptacle filled with insulating oil.

DETAILED DESCRIPTION OF THE INVENTION

Figure 1:
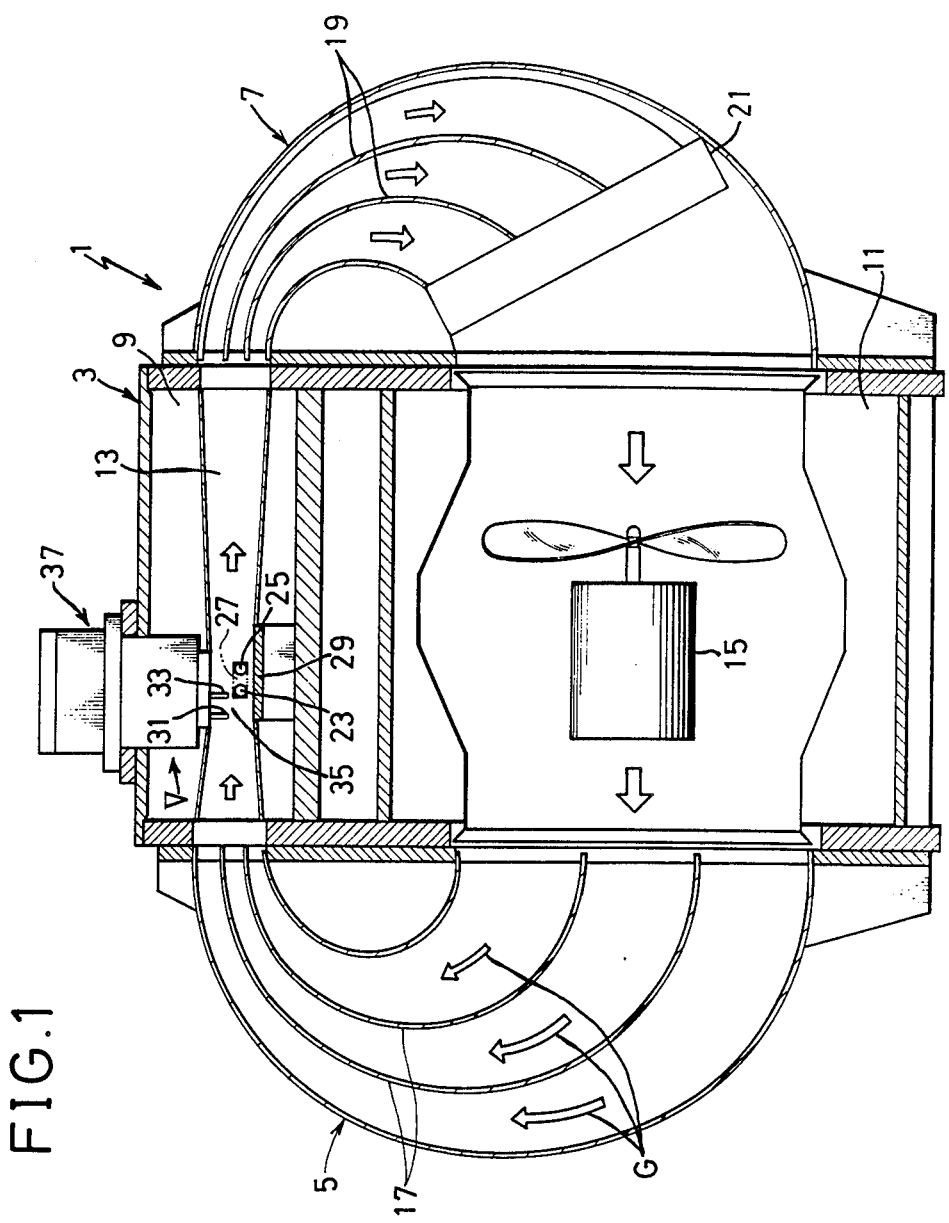
FIG. 1 is a sectional drawing showing an outline of the gas laser generator of the present invention.

Now referring to FIG. 1, a gas laser generator 1 comprises a box-shaped frame body 3 which is open on both the left and right side sections, and a pair of semicircular tubular gas flow guide members 5 and 7 which are mounted on the frame body 3.

The inside section of the frame body 3 is divided into an upper space section 9 and a lower space section 11. Inside the upper space section 9, a gas channel 13 is formed to guide the gas flow in the left to right direction in FIG. 1. A block 15 is positioned in the lower space section 11 to produce the gas G of the laser gas.

A plurality of flow adjustment members 17, which guide the laser gas which is sent out from the block 15 to the gas channel 13, is positioned inside one of the gas flow guide member 5. In addition, a plurality of flow adjustment members 19, which guide the laser gas to the block 15 from the gas channel 13, and a heat exchanger 21 for cooling the laser gas, are positioned inside the other part of the gas flow guide member 7.

As a result of this configuration, when the block 15 is driven rotationally in a suitable manner, the laser gas is circulated in the gas laser generator 1 and is cooled in the heat exchanger 21.

In order to carry out laser oscillation, a plurality of mirrors of an optical resonator are mounted on the left and right sidewalls of the gas channel 13 along the gas flow. Specifically, a rear folding mirror 23 and a primary mirror (rear mirror) 25 are provided on the back sidewall surface of the gas channel 13 (the wall surface on the back side of the sheet in FIG. 1), with the same configuration as the usual triaxial transverse type of gas laser generator. A front folding mirror and an output mirror of the optical resonator (neither of which is shown on the drawing) are provided on the front sidewall surface (also not shown on the drawing) of the gas channel 13.

Accordingly, an optical cavity 27 is formed as a region interposed between a plurality of mirrors in the gas channel 13.

An anode 29, which is the positive discharge electrode for performing the discharge in the gas flow, is provided on the bottom side of the optical cavity 27. In addition, a row of upstream cathodes 31 and a row of downstream cathodes 33, which are the negative discharge electrodes, are provided on the upper side of the optical cavity 27 so that a discharge region 35 is formed between these positive and negative electrodes. The row of upstream cathodes 31 and the row of downstream cathodes 33 are formed from a plurality of needle-shaped electrodes arranged side by side in the direction perpendicular to the surface of the drawing in FIG. 1.

The plurality of needle-shaped electrodes of the cathode row 31 and the cathode row 33, which will be described in detail later, are mounted in the lower section of a cooling receptacle 37 which is mounted on the top of the frame body 3.

Figure 2:
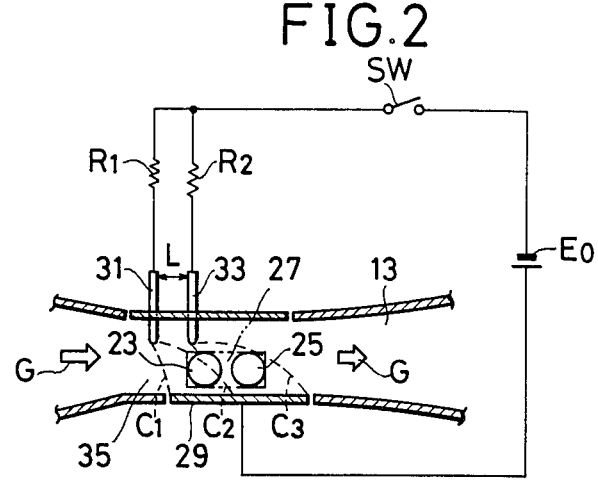
FIG. 2 is an explanatory drawing showing the concept of the discharge region and the circuit of the electrical source of the gas laser generator of the present invention.

Now referring to FIG. 2, the anode 29 is positioned to cover the entire lower surface of the optical cavity 27 in order to cause uniform discharge in the gas flow passing through the optical cavity 27.

As opposed to this, the row of upstream cathodes 31 (hereinafter a row of cathodes will be simply referred to as a cathode) is provided over the end of the upstream side of the anode 29 in order to provide a discharge into the gas flowing through the upstream side of the optical cavity 27.

In addition, the downstream cathode 33 is provided at a distance L downstream from the upstream cathode 31 above the anode 29 in order to discharge into the gas flowing through the downstream side of the optical cavity 27.

In order to perform the discharge between the anode 29 and the cathodes 31, 33, a high voltage DC power source Eo is provided in the discharge circuit. The upstream cathode 31 is connected to this DC power source Eo through a switch SW and an upstream ballast resistance R1 of a predetermined value. In addition, the downstream cathode 33 is connected to the DC power source Eo through the switch SW and a downstream ballast resistance R2 which has a larger resistance value than the upstream ballast resistance R1. The value of the resistance of the downstream ballast resistance R2 may be, for example, three times the value of the resistance of the upstream ballast resistance R1.

In the configuration mentioned above, when the gas laser generator 1 is started up, the blower 15 rotates and the laser gas which is the laser medium is supplied to flow into the gas channel 13. In this way, when the gas flow is introduced into the gas channel 13, and when the discharge switch SW is turned ON, an excitation discharge is commenced between the anode 29 and the cathodes 31, 33. As a result, an excitation discharge from the upstream cathode 31 in the region as indicated by the dotted lines C1, C2 in FIG. 2 is carried out in the gas flowing into the upstream side within the optical resonator 27. Also, an excitation discharge from the downstream cathode 33 in the region as indicated by the dotted line C3 in FIG. 2 is carried out in the gas flowing into the downstream side within the optical resonator 27. Then, a stimulated emission is carried out within the laser gas which is converted to a population inversion status as a result of the excitation discharge. The rays are emitted, amplified and output as a laser beam.

However, a large number of ions are produced from this discharge in the gas flow, and particularly the ions produced in the upstream cathode 31 stream to the space between the downstream cathode 33 and the anode 29. The value of the resistance between the electrodes is suddenly reduced.

Figure 3:
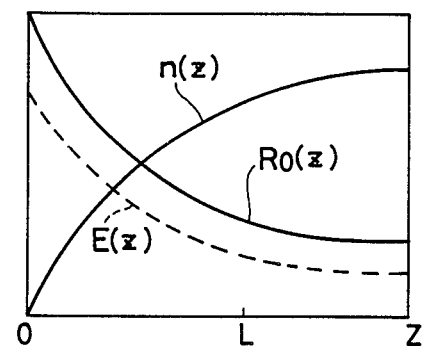
FIG. 3 is a graph showing the relationship between the ion density and the resistance between the electrodes in the discharge region.

This status is displayed graphically in FIG. 3. The abscissa Z shows the position of the coordinates of the shows the ion density, the resistance between the electrodes, and the magnitude of the electrical field. In FIG. 3, $n(Z)$ and $Ro(Z)$ are respectively the ion density and the resistance between the electrodes. In addition, $Z=0$ and $Z=L$ give the coordinates of the positions of the upstream cathode 31 and the downstream cathode 33 respectively.

As can be understood from FIG. 3, at a position close to the downstream cathode 33 ($Z \approx L$), compared to a position close to the upstream cathode 31 ($Z \approx 0$), the resistance between the electrodes has undergone an extreme drop and the excitation discharge status becomes unstable, so that there is a tendency for easy shift into arc discharge.

However, in this embodiment of the present invention, the downstream ballast resistance R2 is set at a value which is larger in comparison to the value of the upstream ballast resistance. Accordingly, in this case, as shown in the electric field intensity curve $E(Z)$, the strength of the electrical field close to the downstream cathode 33 is smaller in comparison with that of the upstream side. In other words, the resistances of the circuits which pass through the upstream cathode 31 and the downstream cathode 33 are almost equal, and the current in the upstream electrical field is almost equal to the current in the downstream electrical field.

For this reason, the excitation discharge in the entire discharge region 35 becomes uniform. There is a uniform transition in the upstream and downstream sides of the laser gas flow to a class of higher energy, and an almost uniform population inversion distribution is obtained.

Next, from this uniform population inversion distribution, when an laser beam is emitted by means of a stimulated emission, the emitted rays are amplified by the optical resonator including the primary mirror 25 and the rear folding mirror 23, and a suitable laser beam pattern at high output is output from the output mirror.

Therefore, a laser beam of high output and suitable mode pattern can be easily output by means of this embodiment of the present invention.

In addition, with this embodiment of the present invention, there is no worry about shifting to arc discharge because of the uniformly developed discharge in the discharge region 35. Further, the sputtering also becomes uniform and the deterioration of the electrodes becomes uniform.

Further, the ratio of the resistance value of the upstream ballast resistance R1 to the resistance value of the downstream ballast resistance R2 is about 1 to 3 in the present embodiment, but is not restricted to this value. It can change according to conditions such as the components of the gas, the distance between the electrodes, the gas flow rate, the voltage between the electrodes, and the like, and a uniform discharge can be uniformly set experimentally as required.

In a further embodiment of the present invention, the upstream or downstream ballast resistances R1 or R2 can be variable resistances. In this case, the resistance can be adjusted and the optimum resistance value selected in correspondence with the gas flow pressure, temperature, flow rate and the like. Accordingly, an even more stable discharge can be realized.

In addition, when this variable resistance is used, the value of the electrical current flowing through the variable resistance can be detected, while the value of the resistance per se can be changed in correspondence with the value of this current. By this means, the value of the ballast resistance can be adjusted occasionally or by the minute to conform to the change of the ion concentration with time, making it possible to obtain an even smoother discharge.

Figure 4:
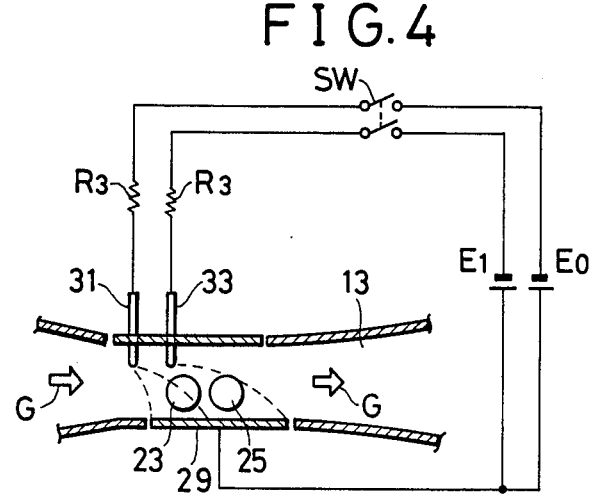
FIG. 4 is an explanatory drawing equivalent to FIG. 2, showing a second embodiment of the present invention.

Further, as shown in FIG. 4, a second power source E1 may be provided from which the output voltage is lower than that from the power source Eo. The power source Eo may be connected to the upstream cathode 31 and the power source E1 to the downstream cathode 33. In this way, the same type of stability as above can be obtained along with a uniform discharge, while the values of a pair of ballast resistances R3 may be always uniform so that installation is extremely easy.

In this embodiment of the present invention there are two rows of upstream and downstream cathodes, but three rows, or even more, are acceptable. In particular, in this case as well, the ballast resistance values of each row may be set to the optimum, and the values of the resistances of the circuits for the cathodes may be almost equal.

Also, in this embodiment of the present invention, it is possible to apply an AC type discharge device, not just the DC type. In this case, each of the electrodes may have different impedence values.

Figure 5:
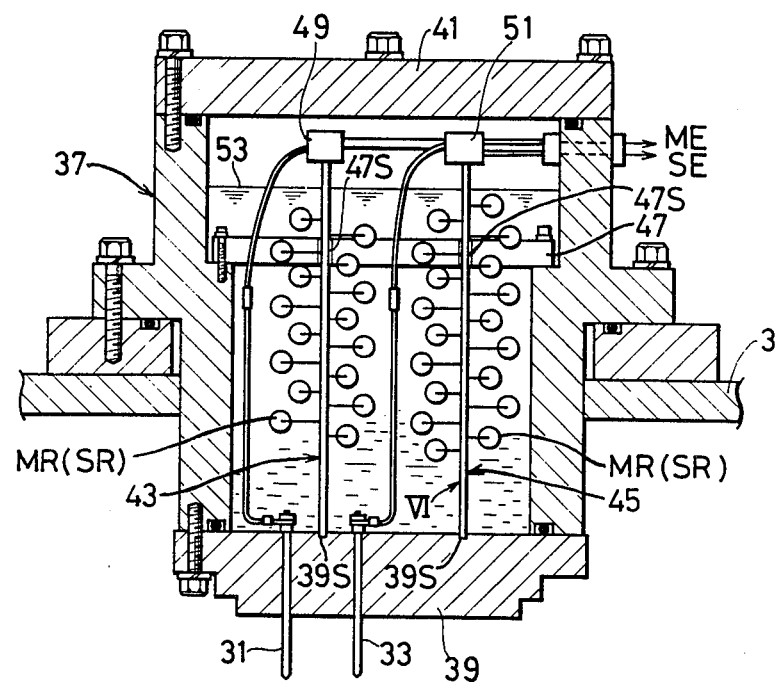
FIG. 5 is a sectional drawing showing enlarged details of the section indicated by the arrow V in FIG. 1.

Now referring to FIG. 5, a cooling receptacle 37 for the ballast resistances which is mounted on the top of the frame body 3 is constructed in the form of a hermetically sealed box to which a lower plate 39 and a top cover 41 are secured by means of a plurality of bolts. Each electrode of the cathode rows 31 and 33 penetrates and is supported by the lower plate 39.

A printed board 43 used for the upstream cathode row 31 and a printed board 45 used for the downstream cathode row 33 are positioned in the cooling receptacle 37. The lower edges of both the printed boards 43 and 45 are engaged with and maintained by a plurality of slots 39S which are formed in the upper surface of the lower plate 39. In addition, the side edges of the printed boards 43, 45 are engaged with and maintained by a plurality of slots 47S which are formed in a pair of maintaining members 47 opposingly mounted inside the cooling receptacle 37.

Accordingly, when the top cover 41 is removed from the cooling receptacle 37 the installation or removal of the printed boards 43, 45 relative to the cooling receptacle can be easily performed.

Figure 6:
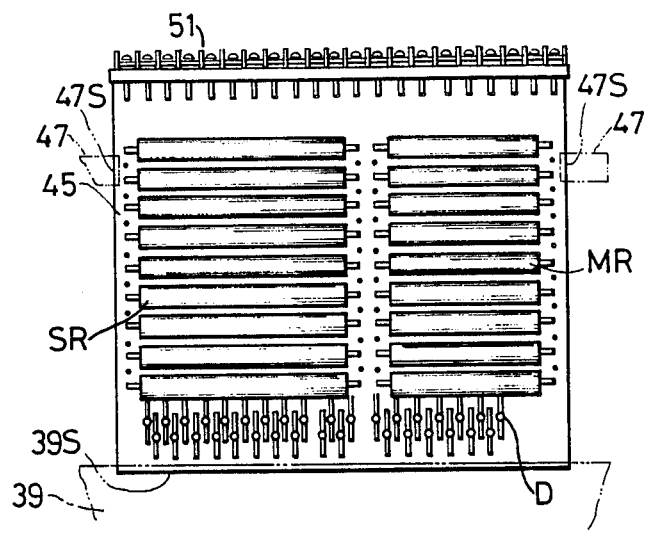
FIG. 6 is an explanatory drawing equivalent to a front elevational view of the printed board indicated by the arrow VI in FIG. 5.
Figure 7:
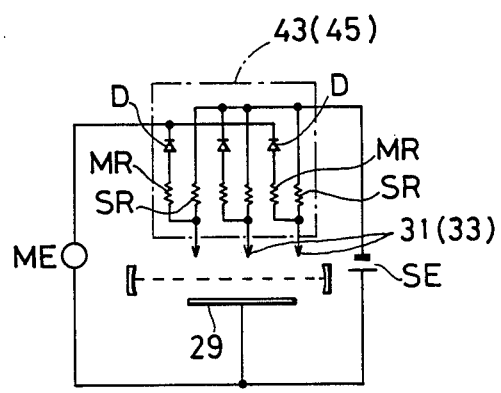
FIG. 7 is an explanatory drawing of the discharge circuit showing the relationship of the connections of the main resistances and the simmer resistances for reference.

On the printed boards 43, 45, as shown in FIG. 5 and FIG. 6, a main resistance MR and a simmer resistance SR, equivalent to the ballast resistances R1 and R2, are systematically mounted on both surfaces, and a diode D is mounted. The number of main resistances MR, simmer resistances SR, and diodes D provided are equivalent in number to the plurality of electrodes of the cathode rows 31, 33, and, as shown in FIG. 7, are connected within the discharge circuit.

In addition, a pair of terminal blocks 49 and 51 are provided on the upper edges of the printed boards 43, 45 respectively. The electrodes and resistances of the cathode rows 31, 33 are connected through the terminal blocks 49, 51 to each other and are then connected to a main power source ME and a simmer power source SE.

Accordingly, the wiring for the resistances MR, SR and the diode D, and the wiring for the electrodes of the cathode rows 31, 33 can be installed with extreme ease. In addition, each of the printed boards can be exchanged as a package so that maintenance is simplified.

In order to cool the resistances MR, SR and the like, the resistances MR, SR and the like are fully immersed in a cooling medium 53 within the cooling receptacle 37. The cooling medium 53 can be, for example, an insulating oil which can be suitably circulated through a heat exchanger or a cooling device and maintained at a uniform temperature.

From this configuration, the resistances MR, SR, and the like are uniformly cooled by the cooling medium 53. Accordingly, any changes in the values of the resistances MR, SR, and the like are small so that the discharge is stable.

The circuit shown in FIG. 7 is essentially the same as the configuration described in U.S. patent application Ser. No. 737,468 so details will be omitted here. The U.S. Patent application is incorporated herein by reference.

As can be understood from the above explanation of this embodiment of the present invention, as a result of the present invention no irregularities are produced in the status of the discharge between the anode and the cathode rows, and a uniform and stable discharge is obtained in the discharge region so that a laser beam with a high output and suitable mode pattern is obtained.

By means of the present invention, the wiring for a plurality of ballast resistances and the like can be performed with extreme ease, the maintenance of the ballast resistances and the like is simplified, and the ballast resistances can be uniformly cooled. Accordingly, a stable discharge is possible.

What is claimed is:
1. A gas laser generator comprising:

a frame;

a gas channel having right and left side portions arranged within the frame, through which a gas flows;

mirror means for obtaining a laser beam, defining a resonant cavity having upper and lower portions and being positioned in the left and the right side portions of the gas channel and mutually opposed to one another;

an anode electrode arranged in the lower portion of the resonant cavity;

at least two first cathode electrodes arranged in the upper portion of the resonant cavity in the upstream side of the anode electrode;

at least two second cathode electrodes arranged in the upper portion of the resonant cavity at a predetermined distance away from the first cathode electrodes in the downstream side of the resonant cavity; and power source means for applying voltages between the anode electrode and the first and the second electrodes, characterized in that a first voltage of a first electric field between the first cathode electrodes connected to the power source means through a first ballast resistance and the anode electrode and a second voltage of a second electric field between the second cathode electrodes connected to the power source means through a second ballast resistance and the anode electrode are so determined that the second voltage is smaller than the first voltage so that the current flowing in the first electric field may be substantially equal to the current flowing in the second electric field during the electric discharge between the electrodes.

2. A gas laser generator as claimed in claim 1, wherein the power source means is a DC power source, and the value of the second ballast resistance is larger than the value of the first ballast resistance.

3. A gas laser generator as claimed in claim 1, wherein the power source means comprises a first DC power source connected to the first cathode electrodes through the first ballast resistance, and a second DC power source connected to the second cathode electrodes through the second ballast resistance, the output voltage of the first power source being larger than that of the second power source, the value of the first ballast resistance being substantially equal to that of the second ballast resistance.

4. A gas laser generator as claimed in claim 2, wherein one of the first and the second ballast resistances is a variable type.

5. A gas laser generator as claimed in claim 1, wherein the distance between the first cathode electrodes and the anode electrode is substantially equal to that between the second cathode electrodes and the anode electrode.

6. A gas laser generator as claimed in claim 1, wherein each of the first and the second cathode electrodes comprises a needle-shaped electrode, and the first and the second cathode electrodes are aligned at an equal distance in parallel with one another in the direction perpendicular to the flowing direction of the gas in the gas channel.

* * * * *